Patented Feb. 18, 1930

1,747,574

UNITED STATES PATENT OFFICE

FRANK P. BROCK, OF HINSDALE, ILLINOIS, ASSIGNOR TO BAKELITE CORPORATION, OF NEW YORK, N. Y., A CORPORATION OF DELAWARE

MOLDING MIXTURE

No Drawing.  Application filed June 28, 1926. Serial No. 119,223.

This invention is a novel molding mixture comprising in its preferred embodiment a fibrous filler, a resinous or similar binder, and a pigment, lake or equivalent colored component, said molding mixture so constituted as to give grained or variegated effects in the article molded therefrom. The invention also includes the method of preparing the molding mixture.

Molding mixtures comprising wood flour, a resinous binder which may be for example of the reactive phenol-aldehyde type, and a pigment or dye, are commonly used, the components of the mixture being thoroughly blended to give a homogeneous color effect, such as black or brown, in the molded article. In some cases the blending is less thorough, or the colored particles are of relatively large size, with the result that the molded article presents a speckled or mottled appearance, which may be pleasing when the colors are well chosen.

In contradistinction to such homogeneous or variegated color effects as are mentioned above, the present invention relates to grained effects in which the color is distributed along definite flow lines, instead of in small and irregularly distributed spots or areas. I secure this effect by first preparing a mixture of the second of the above-mentioned types, that is to say, of the type in which the colored particles are of substantial size and distributed with more or less regularity as discrete particles through the mass or body of the mixture. These colored particles may consist for instance of loose aggregates of dyed wood fiber, or of pigmented or dyed aggregates of any kind which are sufficiently fragile to be broken up or deformed under pressure. This mixture I extrude through perforations or slots by powerful pressure applied by means of a plunger, the apparatus being for example of the kind used in the manufacture of spaghetti. The molding mixture is thereby extruded into small cylinders, prisms, sheets or other elongated shapes, in each of which pigmented or dyed particles, which existed initially in the form of minute lumps or particles, are drawn into lines extending longitudinally of the extruded mass. These latter are broken off in any appropriate or desired lengths, and constitute the novel molding mixture which is the subject of this invention. Since this mixture consists of cylinders, sheets or other shapes in which the color is not uniformly distributed but is longitudinally extended, the mixture yields a molded article showing irregularly disposed lines of color simulating graining effects, cloud effects or the like, of pleasing and ornamental character. These effects may be modified as desired by more or less finely comminuting the extruded mixture, avoiding of course such minute subdivision of the color as would afford homogeneous coloring.

I claim:

1. A molding mixture comprising a potentially reactive resin binder, a filler, and coloring material, and consisting of an extruded mass comprising a plurality of elongated bodies having various colors, said bodies being united into an elongated preformed mass and arranged approximately longitudinally therein.

2. A sheeted molding mixture comprising a potentially reactive resin binder, a filler, and coloring material, and consisting of an extruded mass comprising a plurality of elongated bodies having various colors, said mass of bodies being extruded in the form of a sheet, said variously colored bodies being arranged approximately longitudinally in said extruded sheet.

3. Method of making a molding mixture comprising commingling a potentially reactive resin binder, a filler, and coloring material, the latter in the form of discrete particles, and extruding said mixture into an elongated preformed mass of variegated color without substantial reaction thereof, whereby a potentially reactive but predominantly unreacted molding mixture comprising a plurality of extruded bodies arranged approximately longitudinally of said extruded mass is obtained.

In testimony whereof, I affix my signature.

FRANK P. BROCK